United States Patent [19]
Ericsson

[11] B 3,928,746
[45] Dec. 23, 1975

[54] DIRECT CURRENT POWER SUPPLY FOR MANUAL ARC WELDING

[75] Inventor: Rolf Ericsson, Laxa, Sweden

[73] Assignee: Elektriska Svetsningsaktiebolaget, Goteborg, Sweden

[22] Filed: Apr. 18, 1973

[21] Appl. No.: 352,445

[44] Published under the Trial Voluntary Protest Program on January 28, 1975 as document no. B 352,445.

[30] Foreign Application Priority Data
Apr. 18, 1972 Sweden.............................. 4963/72

[52] U.S. Cl......... 219/135; 219/131 WR; 323/89 A
[51] Int. Cl.²........................................... B23K 9/10
[58] Field of Search..... 219/131 WR, 131 R, 131 F, 219/135; 321/19; 323/89 A

[56] References Cited
UNITED STATES PATENTS
3,530,359  9/1970  Grist .............................. 219/135 X
3,584,186  6/1971  Stearns et al................ 219/131 WR

OTHER PUBLICATIONS
A. F. Manz, "The One Knob Welder," *Welding Journal*, Sept. 1968, pp. 720–725.

Primary Examiner—J. V. Truhe
Assistant Examiner—Clifford C. Shaw
Attorney, Agent, or Firm—Cameron, Kerkam, Sutton, Stowell & Stowell

[57] ABSTRACT

A direct current power supply for manual arc welding comprising a polyphase transformer, a polyphase rectifier system including triggered rectifier valves, and a control system therefor which comprises means for setting the output current level by adjustment of a reference signal, means providing negative feed-back of the output voltage and the output current, and means for adjusting the slope of the characteristic by adjustment of the proportion between the amounts of feed-back of the voltage and the current. The current level setting means and the slope adjustment means are linked with each other to provide automatically a desired correlation between the slope and the current setting.

10 Claims, 15 Drawing Figures

DIRECT CURRENT POWER SUPPLY FOR MANUAL ARC WELDING

BACKGROUND OF THE INVENTION

This invention relates to a direct current power supply for manual arc welding having a steeply drooping, adjustable characteristic. In this context, the expression "steeply drooping" should be understood to indicate that the short circuit current exceeds the arc current by not more than 50 %. More particularly, the invention relates to a power supply of the type comprising a polyphase transformer, a polyphase rectifier system connected to the secondary of said polyphase transformer, said rectifier system comprising a set of triggered rectifier valves connected one in series with each secondary phase circuit of the polyphase transformer, a pair of welding current conductors connected to the output of said polyphase rectifier system, means for controlling the firing angle of the triggered rectifier system in response to a direct current control signal, and signal generating means for producing said direct current control signal, said signal generating means comprising means for producing an adjustable direct current reference signal, means including a welding current sensing means for producing a welding current feed-back direct current signal, and,     summing means for combining said reference signal and said welding current feed-back signal into a compound signal constituting the control signal aforementioned, said feedback signal being supplied to said summing means in opposing relationship to said reference signal.

In a welding power supply of this kind described in the U.S. Pat. No. 3,530,359, the adjustable D.C. reference signal is obtained by the combining of two component signals, both of which are individually adjustable. More particularly, one adjusting member is provided for the first component, while two adjusting members independent of each other and of said first-mentioned adjusting member are provided for the second component. One of said two last-mentioned adjusting members also serves to control the slope of the characteristic through adjustment of the factor of proportionality between the welding current feed-back signal and the welding current. Consequently, the proper adjustment of the apparatus involves the manipulation of three independent controls, which tends to confuse the operator. Operators therefore tend to leave the slope control alone, so that the power supply operates with a constant slope throughout the current range. This mode of operation necessarily results in some sacrifice of welding properties in part of the welding current range.

SUMMARY OF THE INVENTION

The present invention provides an improved arc welding power supply of the type above specified which is easy and simple to adjust in such a way that satisfactory welding properties are obtained throughout the current range of the power supply. In one form of the present invention, the signal generating means for producing the D.C. control signal comprises the following means, to wit, a. means for producing an adjustable direct current reference signal, including manually operable means for adjusting said reference signal, b. means including a welding current sensing means for producing a welding current feed-back D.C. signal equal to the welding current multiplied by a first factor of proportionality, c. means including a welding voltage sensing means for producing a welding voltage feed-back D.C. signal equal to the welding voltage multiplied by a second factor of proportionality, d. summing means for combining said reference signal, said welding current feed-back signal and said welding voltage feed-back signal into a compound signal constituting the control signal aforementioned, both of said feed-back signals being supplied to said summing means in opposing relationship to said reference signal, e. slope adjustment means comprising means for adjusting the proportion between said first and second factors of proportionality, and, f. means linking said manually operable means for adjusting the reference signal and said proportion adjusting means to provide automatically a desired correlation between the slope of the characteristic and the reference signal setting.

In a modified form of the invention, the signal generating means for producing the D.C. control signal comprises the following means, to wit, a. means for producing an adjustable D.C. reference signal, including manually operable means for adjusting said reference signal, b. means including a welding current sensing means for producing a welding current fed-back D.C. signal equal to the welding current multiplied by a first factor of proportionality, c. means including a welding voltage sensing means for producing a welding voltage feed-back D.C. signal equal to the welding voltage multiplied by a second factor of proportionality, d. a capacitor connected in series with a resistor, means including a welding voltage sensing means for submitting said series connection to potential variations proportional to the variations of the welding voltage, and means for producing a transient feed-back signal equal to the voltage appearing across said resistor multiplied by a third factor of proportionality, e. summing means for combining said reference signal, said welding current feed-back signal, said welding voltage feed-back signal and said transient feed-back signal into a compound signal constituting the control signal aforementioned, said welding current feed-back signal and said welding voltage feed-back signal being supplied to said summing means in opposing relationship to said reference signal, transient feed-back signals caused by discharge of said capacitor being supplied to said summing means in aiding relationship to said reference signal, f. transient slope adjusting means comprising means for adjusting the proportion between said first and said third factors of proportionality, and, g. means linking said manually operable means for adjusting the reference signal and said proportion adjusting means to provide automatically a desired correlation between the transient slope of the characteristic and the reference signal setting.

In a preferred embodiment of the invention, the features of both of the forms of the invention above set out are combined so as to provide a desired correlation between both the static and the transient feed-back signals and the reference signal setting.

Other features, advantages and benefits of the present invention will become apparent from the following description of embodiments of the invention, taken in conjunction with the acompanying drawing.

BRIEF DESCRIPTION OF THE DRAWINGS

FIG. 1 is a circuit diagram of a first embodiment of a welding power supply according to the invention, FIGS. 1a and 1b each show a modified form of part of the circuit of FIG. 1.

DESCRIPTION OF THE EMBODIMENTS

Figures 1, 1A, 1B:
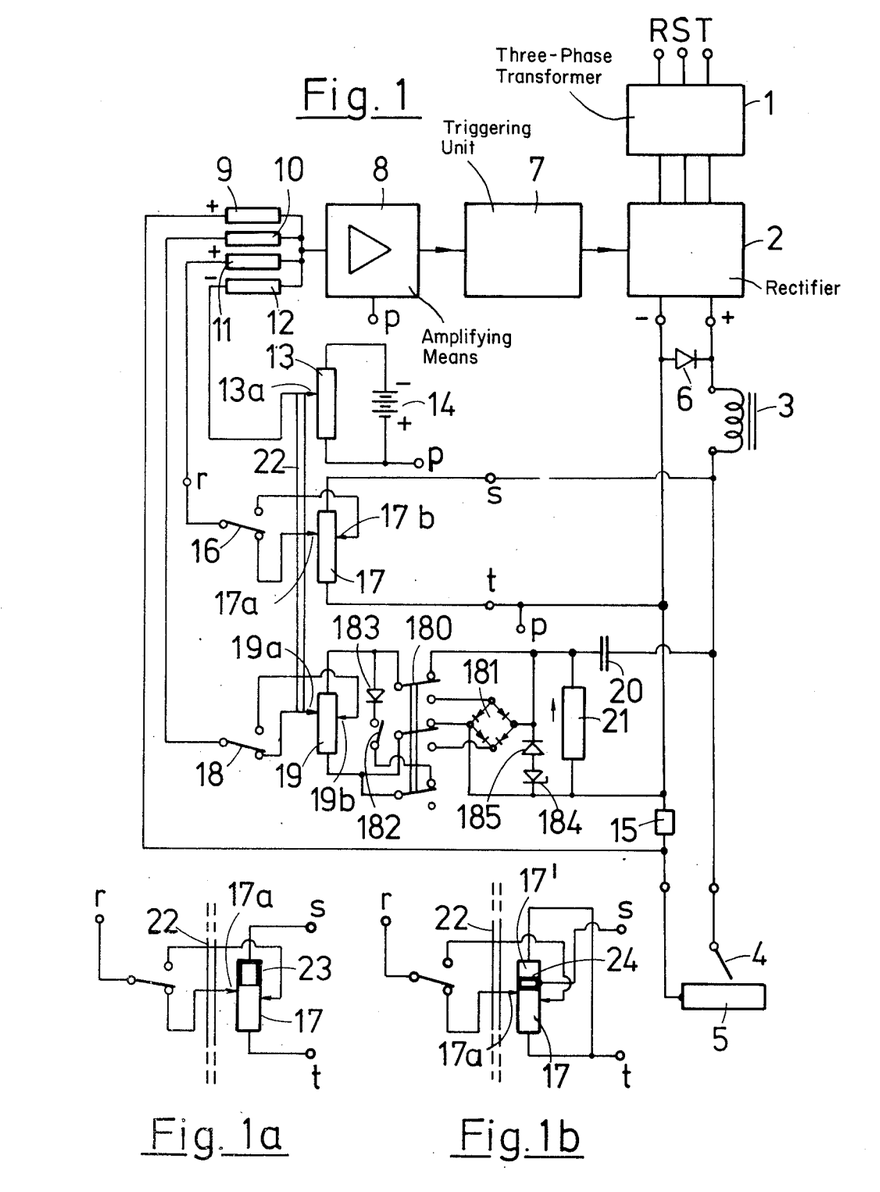

The welding power supply of FIG. (1 comprises a three-phase transformer 1 having input terminals R, S, T connected to a three-phase power line. The transformer 1 has a low magnetic leakage (low internal reactance) and may be a power transformer of the usual type in which the windings are carried by a common, three-legged core. The secondary of said transformer is connected to a rectifier 2 provided with triggered rectifier valves. A welding circuit connected to the output of the rectifier contains an inductor 3 in series with a welding electrode 4 and a workpiece 5. A free-wheel diode 6 is connected between the end of the inductor winding connected to the rectifier and the other welding current conductor. The rectifier 2 is controlled by a triggering unit 7 which supplies a series of triggering pulses synchronized with the line voltage to the firing leads of the triggered rectifier valves. The phase angles of said triggering pulses are controlled in response to a control signal supplied to the triggering unit by amplifying means 8. The input of said amplifier means is connected to a summing circuit comprising four resistors 9, 10, 11, 12. The resistor 12 is connected to the movable tap 13 a of a potentiometer connected to a source 14 of constant D.C. voltage. Consequently, the resistor 12 conducts a constant current adjustable by means of the tap 13a. The resistor 9 is connected to a welding current sensing means comprising a resistor 15 connected in series in one of the welding current conductors. Accordingly, the resistor 9 conducts a current proportional to the welding current. A two-way switch 16 connects the resistor 11 to one or the other of two adjustable taps 17a, 17b on a potentiometer 17 connected to the welding voltage. The points marked P in the diagram are galvanically connected with each other by conductor means not shown and define the zero potential of the control signal generating circuit. The three currents flowing through the resistors 9, 11, 12 are added algebraically in the summing circuit. The polarities or directions of the respective currents are so arranged as to make the currents through the resistors 9 and 11 oppose the current through the resistor 12. The amplifying means 8 is assumed to be of the inverting type, in which the polarity of the output voltage is opposed to the one of the input voltage. Therefore, the potentiometer 13 is arranged to provide a negative potential to the resistor 12 of the summing circuit.

A two-way switch 18 connects the resistor 10 of the summing circuit to one or the other of two adjustable taps 19a, 19b of a potentiometer 19 supplied through circuit arrangements described below with a voltage varying with the charge or discharge current through a capacitor 20. Said capacitor in series with a resistor 21 is connected to the welding voltage. In the stationary state, no current flows through siad series circuit. Consequently, both of the taps 19a 19b are at zero potential, and no current flows through the resistor 10. In the stationary state, therefore, the input voltage of the amplifier means 8 as well as its output voltage are equal to the difference between a constant term and the sum of one term proportional to the welding current and one term proportional to the welding voltage. The control signal built up in this way is supplied to the triggering unit 7 and determines the phase angle of the firing pulses supplied by the triggering unit to the rectifier 2. The described negative feed-back of the welding current and the welding voltage imparts to the rectifier a drooping static characteristic the position and slope of which are determined by the adjustment of the potentiometer taps 13a and 17a or 17b. More particularly, the setting of the potentiometer tap 13a determines the magnitude of the short-circuit current, while the setting of the potentiometer tap 17a or 17b determines the slope, or angle of inclination, of the characteristic.

According to the invention, the potentiometer taps 13a, 17a, 19a are mechanically linked by a member 22 causing every setting of the tap 13a to correspond to a definite setting of each of the taps 17a, 19a. When the two-way switch 16 is in the lower position shown there is, therefore, a definite correlation between the short-circuit currents determined by the positions of the tap 13a and the positions of the tap 17a. Said correlation is preferably based on practical experiments for finding out the best static slope at every current setting. In the circuit of FIG. 1, the steepness of the characteristic is reduced with increasing current settings throughout the current range (provided the switch 16 is in the lower position). It is, however, sometimes preferred to maintain a constant slope in the upper part of the current range, or even to provide for some increase of the steepness at high currents. Such arrangements may be necessary or advisable in power supplies in which the current settings at the upper end of the current setting range approach the current carrying capacity of the rectifier, FIG. 1a and 1b exemplify accordingly modified circuits, each of said FIGS. 1a and 1b being assumed to replace the part of the circuit of FIG. 1 connected between the points r, s, t of the circuit. In the circuit of FIG. 1a, the voltage carrying end of the potentiometer 17 is provided with a contact sheath 23 forming part of the contact path of the adjustable tap 17a. Consequently, the factor of proportionality between the voltage supplied by the tap 17a and the welding voltage first increases on increase of the current setting, but remains constant when the tap 17a arrives to the part of the contact path formed by the sheath 23. In the circuit of FIG. 1b, the voltage carrying end of the potentiometer 17 is provided with a contact sheath 24 aligned with a second potentiometer $17^1$ connected to the welding voltage. The tap 17a is movable along the potentiometer unit constituted by potentiometers 17 and 17¹ and the contact sheath 24. When the tap 13a of the current range setting potentiometer 13 is displaced from low towards higher current settings, the tap 17a (FIG. 1a) linked with the tap 13a by means of the member 22 is displaced first along the potentiometer 17, resulting in an increase of the factor of proportionality of the voltage feed-back component to the control signal, then along the contact sheath, resulting in no further change of the factor of proportionality, and finally along the potentiometer 17¹, resulting in a successive reduction of the factor of proportionality. Consequently, the steepness of the voltage supply characteristic will first be reduced, then remain constant within a certain current setting interval, and finally again be increased in the region of the highest current settings.

The potentiometer 19 is connected to the series resistor 21 of the capacitor 20 by a switch 180. In the lower position of the switch, a full-wave rectifier 181 is interposed between the resistor 21 and the potentiometer 19. Let it first be assumed that the switch 180 is in the upper position shown in the figure and that there occurs a sudden drop of the welding voltage impressed on the series connection of the capacitor 20 and the resistor 21. Said drop may for instance be due to a short circuit between the welding electrode 4 and the workpiece 5. A discharge current will then flow through the resistor 21 in the direction indicated by the arrow. Consequently, the upper extremity of the resistor 21 as well as the upper extremity of the potentiometer 19 will assume a negative potential for the duration of the discharge of the capacitor 20. The resulting control signal component supplied by the adjustable tap 19a and the resistor 10 will be in aiding relationship to the reference component supplied by the tap 13a. A sudden increase of the welding voltage will result in a transient control signal component in opposing relationship to the reference component. It follows that the transient control signal component caused by a sudden change of the welding voltage will reduce the static steepness due to the setting of the potentiometer 17 irrespectively of whether said change is an increase or a decrease. When a short circuit occurs between the electrode and the work, the circuit provides a transient addition to the short-circuit current determined by the static characteristic. This facilitates the initiating of the arc. On the other hand, the transient control signal component appearing on termination of the short circuit at first causes the arc current to drop below the one determined by the intersection between the static characteristic and the arc characteristic. This transient reduction of the arc current often causes no ill effects, but performs no useful function and must be considered to be undesirable. The circuit of FIG. 1 includes a pair of alternative means for eliminating the transient reduction of the arc current. The first of said means comprises a rectifier valve 183 which can be connected in parallel with the potentiometer 19 by means of a switch 182. The polarity of said rectifier valve is such as to render said rectifier valve conducting in respect of the voltage produced across the resistor 21 by a current charging the capacitor 20 (that is, having a direction opposite to the one indicated by the arrow). On increase of the welding voltage, therefore, the rectifier valve 183 short-circuits the potentiometer 19, resulting in suppression of the transient control signal component. Consequently, the performance of the power supply will be determined by the static characteristic alone at increasing welding voltages, while a desired transient addition to the static short-circuit current is obtained at short circuit.

The second of the alternative means referred to consists of the full-wave rectifier 181 which is connected in circuit in the lower position of the switch 180. Said rectifier is poled so as to produce a polarity reversal of the voltage supplied to the potentiometer 19 when a charging current flows through the resistor 21. Consequently, the potential impressed upon the upper terminal of the potentiometer 19 on a change of the welding voltage will always be negative, irrespectively of whether said change is an increase or a decrease. It follows that the transient control signal component caused by a sudden voltage drop produces, as before, a transient reduction of the steepness of the characteristic, while the transient control signal component caused by a sudden increase of the werlding voltage produces a transient increase of the steepness of the characteristic. In other words, the transient control signal component appearing on termination of a short circuit between the electrode and the workpiece makes the power supply provide an arc current exceeding the one determined by the intersection between the static characteristic and the arc characteristic. This action assists the maintaining of the arc in the first moments after ignition. The resistor 21 is connected in parallel to the series connection of a Zener diode 184 and a rectifier valve 185. The polarity of the rectifier valve is such as to render the rectifier valve non-conducting with respect to voltages caused by a charging current through the resistor 21. With respect to voltages in the other direction (corresponding to discharge of the capacitor 20) the rectifier valve 185 is conducting, causing the entire voltage to be impressed upon the Zener diode 184. The Zener diode serves as a voltage limiter preventing the voltage appearing across the resistor 21 on short circuit between the electrode and the workpiece from exceeding a predetermined value. Said value is substantially lower than the open circuit voltae of the power supply but somewhat above the normal arc voltage range.

It will be appreciated that the arrangement described provides a limitation of the maximum value of the transient voltage supplied to the potentiometer 19 on short circuit between the electrode and the workpiece, and a corresponding limitation of the transient component of the control signal. This is desirable for the following reasons. The factor of proportionality of the transient control signal component set by the tap 19a or 19b is adjusted to provide a suitable transient increase of the current appearing at a short circuit during a welding operation, that is, at a sudden drop from the arc voltage to zero. A short circuit starting from the open circuit state, which occurs at the first initiation of the arc or at an arc initiation following upon an accidental extinction during the welding operation, results, however, in a much larger voltage leap (from the open circuit voltage to a voltage near zero) and a correspondingly large discharge current. If not the Zener diode 184 were provided, this large discharge current would cause a corresponding increase of the transient control signal component, resulting in a transient increase of the short-circuit current to an inconveniently large value.

Figure 2A:
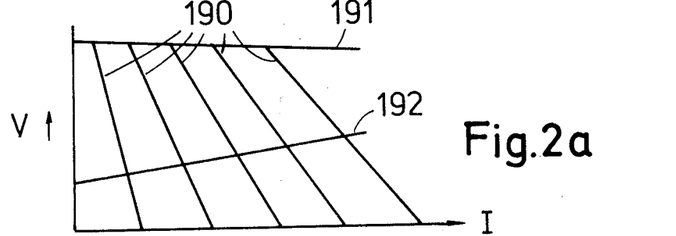
FIGS. 2a to e are voltage-current diagrams illustrating the operation of the systems of FIG. 1.

FIGS. 2a–d illustrates the function of the system according to FIG. 1. FIG. 2a is based on the assumption that the two-way switch 16 in FIG. 1 is in the lower position shown in the figure. This arrangement provides static characteristics 190 having a steepness, or angle of inclination to the horizontal, decreasing the increase of the short-circuit current setting. The line 191 represents the characteristic of the power supply for fully conducting rectifiers and has a faint slope caused by the unavoidable voltage losses in the transformer 1 and the rectifier 2. The line 192 is an average arc characteristic for a coated electrode for manual welding.

Figure 2B:
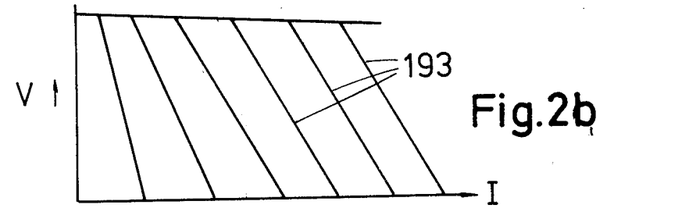

FIG. 2b schematically shows a family of characteristics obtained with the modified circuit of FIG. 1a. In the lower half of the current range, the steepness of the characteristics decreases on increase of the current setting. Characteristics 193 having a constant steepness are obtained in the upper half of the current range, in which the tap 17a engages the contact sheath 23.

Figure 2C:
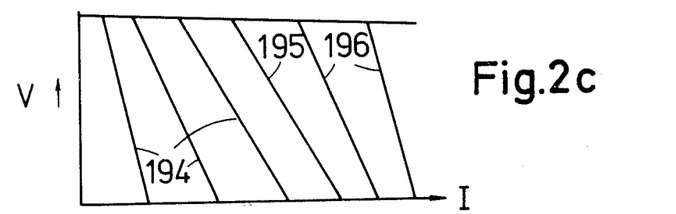

FIG. 2c schematically shows a family of characteristics otained with the modified circuit of FIG. 1b. On increase of the current setting from the lowest value, the steepness of the characteristics first decreases (the characteristics 194), then remains constant (the characteristics 194, 195) within a certain range of current settings (corresponing to the displacement of the tap 17a across the contact sheath 24) and finally increases with the current setting (the characteristics 196) within the uppermost part of the current range, corresponding to positions of the tap 17a on the potentiometer $17^1$.

Figure 2D:
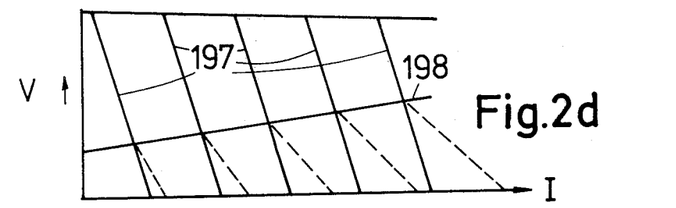

In all of the cases described above with reference to FIGS. 2a–c, the switch 18 may occupy either the lower position shown, in which the factor of proportionality between the initial magnitude of the transient control signal component appearing at a sudden change of the voltage and the magnitude of said sudden change is adjusted along with the current setting, or its upper position, in which said factor of proportionality has a constant magnitude determined by the position of the tap 19b. FIG. 2d shows a group of static characteristics 197 and an average arc characteristic 198. The dotted lines represent the dynamic characteristics coming into play at short circuits during welding, or at the termination of such short circuits. The switch 18 is assumed to occupy the lower position shown, whereby the factor of proportionality for the transient control signal component is increased on increase of the current setting. The switch 16 is assumed to be in its upper position in which the steepness of the characteristics is determined by the setting of the tap 17b. Accordingly, all of the static characteristics of FIG. 2d have the same steepness. In actual practice, it is of course possible, and, as a rule, also advisable to vary both the factor of proportionality of the welding voltage feed-back component of the control signal and the factor of proportionality of the transient component of the control signal, in which case both of the switches 16, 18 have to occupy their lower positions.

Figure 2E:
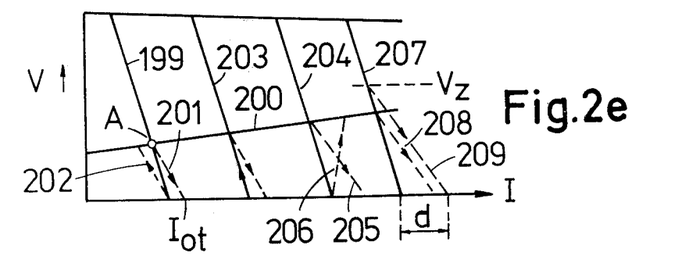

The static characteristic 199 shown at the left in FIG. 2e is represented together with a pair of dynamic characteristics 201, 202 obtained with the system of FIG. 1 with the switch 180 in its upper position and the switch 182 open. It is assumed that the arc burns at a current and a voltage determined by the intersection A between the static characteristic 199 and the arc characteristic 200, and that a sudden short circuit takes place. The shortcircuit current $I_{ot}$ in the first moment constitutes the sum of the short-circuit current determined by the static characteristic and the transient contribution due to the transient control signal component supplied through the tap 19a. The dotted line 201 is the corresponding dynamic characteristic. The line 202 represents the dynamic characteristic on termination of a short circuit (which is assumed to have lasted a time sufficient to cause the transient component of the control signal caused by the short circuit to drop to zero). The transient control signal component caused by the sudden increase of the voltage tends to adjust the arc current to a value below the one given by A. The dynamic characteristics represented together with the static characteristic 203 illustrate the behaviour of the system in the case that the switch 182 is closed. The dynamic characteristic and the contributory short-circuit current due thereto correspond to those occurring in the case just described. The sudden increase of the voltage appearing on termination of the short circuit does, however, not produce any transient component of the control signal, as the rectifier valve 183 now prevents any voltage from appearing across the potentiometer 19.

The dynamic characteristics 205 and 206 illustrate the behaviour of the system in the case that the switch 180 occupies its lower position. 205 is the dynamic characteristic obtained at a short circuit, while 206 is the dynamic characteristic coming into play on termination of a short circuit. Owing to the action of the full-wave rectifier 181, the transient control signal component in both cases adjusts the current to a value exceeding the one determined by the static characteristic.

The dynamic characteristics shown together with the static characteristic 207 illustrate the action of the Zener diode 184. 208 is a dynamic characteristic obtained on short-circuiting of an arc, while 209 is the dynamic characteristic obtained on short circuit from the open circuit condition. In the latter case, the transient control signal component is not proportional to the full open circuit voltage, as the potential across the resistor 21 cannot assume a value exceeding the limit voltage $V_z$ of the Zener diode. Consequently, the transient current addition $d$ produced on a short circuit from the open circuit condition does not much exceed the transient current addition produced on short-circuiting of an arc.

Practical welding current power supplies according to the invention are not equipped with the many switches 16, 18, 181, 182 of FIG. 1, which serve to illustrate the available possibilities open to the designer of the control system of the power supply according to the invention. The designer chooses to definite circuit arrangement, for instance a circuit corresponding to the lower position of the switch 16 and the upper position of the switch 18, or a circuit corresponding to the lower positions of both of the switches, or a circuit corresponding to the upper position of the switch 16 and the lower position of the switch 18, and adapts the circuit constants to the particular circuit arrangement chosen.

The time constant of the transient control signal component must not be too low. It should amount to at least 0.1 seconds, preferably at least about 0.2 seconds. A time constant of the order of 0.5 seconds is adequate for most practical cases.

Figure 3:
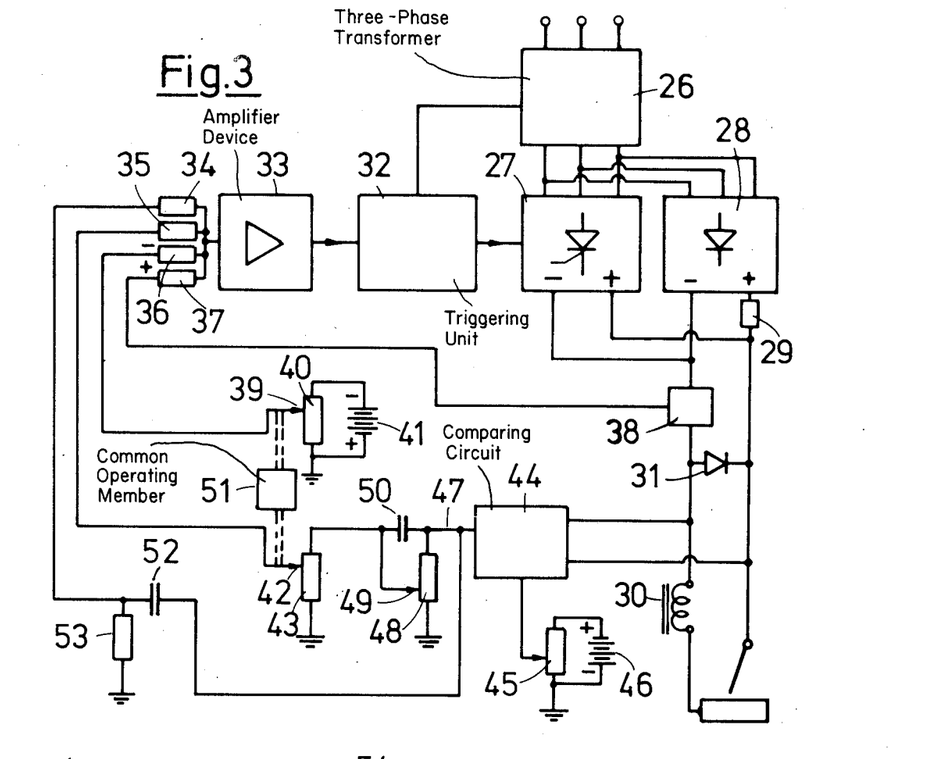
FIG. 3 is a circuit diagram of a second embodiment of a welding power supply according to the invention.

The embodiment of the invention schematically shown in FIG. 3 comprises a three-phase transformer 26 the secondary of which is connected to a main rectifier 27 and an auxiliary rectifier 28. The main rectifier is provided with triggered rectifier valves to allow the control of the output current. The auxiliary rectifier 28 comprises plain (non-controlled) rectifier valves only. Both of the rectifiers are arranged to feed one and the same welding circuit. The auxiliary rectifier is connected in series with a resistor 29 limiting the short-circuit current of the auxiliary rectifier to a low value. The welding circuit contains a series inductor 30. A freewheel diode 31 is connected between the conductor connecting the inductor with a power supply and the other welding current conductor. The rectifier 27 is controlled by a triggering unit 32 to which a control signal is supplied by an amplifier device 33. The input end of the amplifier device 33 is connected to a summing circuit comprising four resistors 34, 35, 36, 37. The resistor 37 is connected to a welding current sensing means 38 provided in one of the welding current conductors, resulting in a flow of current through the resistor 37 proportional to the welding current. The resistor 36 is connected to an adjustable tap 39 of a potentiometer 40 connected to a source of constant D.c. voltage 41. The resistor 35 is connected to an adjustable tap 42 of a potentiometer 43 supplied by a comparing circuit 44 with a voltage varying with the welding voltage. The taps 39 and 42 are provided with a common operating member 51 constituting a mechanical link between said taps. The comparing circuit 44 is connected to the welding voltage between the welding current conductors and also to a constant voltage supplied by a potentiometer 45 connected to a source of constant voltage 46. The comparing circuit is arranged to supply to a conductor 47 a potential proportional to the difference between the welding voltage and a constant voltage $V_r$, said voltage $V_r$ being equal to or bearing a predetermined proportion to the voltage supplied by the potentiometer 45. The output potential of the conductor 47 is supplied to a potentiometer 48 the tap 49 of which is connected to the potentiometer 43 above referred to. A capacitor 50 connected between the conductor 47 and the tap 49 of the potentiometer 48 has a function identical with the one of the capacitor 20 of the circuit of FIG. 1.

The input voltage or control voltage supplied to the amplifier means 8 by the summing circuit 35, 36, 37 contains the following (static) components:

a. A constant component adjustable by means of the potentiometer 40, b. a constant component adjusable by means of the poetentiometer 48 and 43, said component acting in the same sense as the cmponent $a$, c. a component varying with the welding voltage and opposed to the component $a$, the factor of proportionality between said component and the welding voltage being adjusted by means of the potentiometers 48 and 43, d. a component opposed to the component $a$ and varying with the welding current (supplied by the current sensing means 38).

The sum of the adjustable components $a$ and $b$ constitutes the constant reference component of the control signal and corresponds to the reference signal supplied in the circuit of FIG. 1 by the potentiometer 13 and the resistor 12. The control system operates in the same way as the one provided by the circuit of FIG. 1 when the switches 16, 18, 180 and 182 occupy the positions shown.

The transient control signal component supplied to the amplifier device through the capacitor 50 is reduced by the potentiometer 43 in the same proportion as the static component. At the lower end of the current range, the transient control signal thus produced and the resulting transient current increase on short circuit is too low. To provide a contributory transient control voltage, a resistor 34 forming part of the summing circuit at the input of the amplifier device 33 is connected to the output conductor 47 of the comparing circuit 44 through a circuit comprising a series capacitor 52 and a shunt resistor 53.

Figure 4:
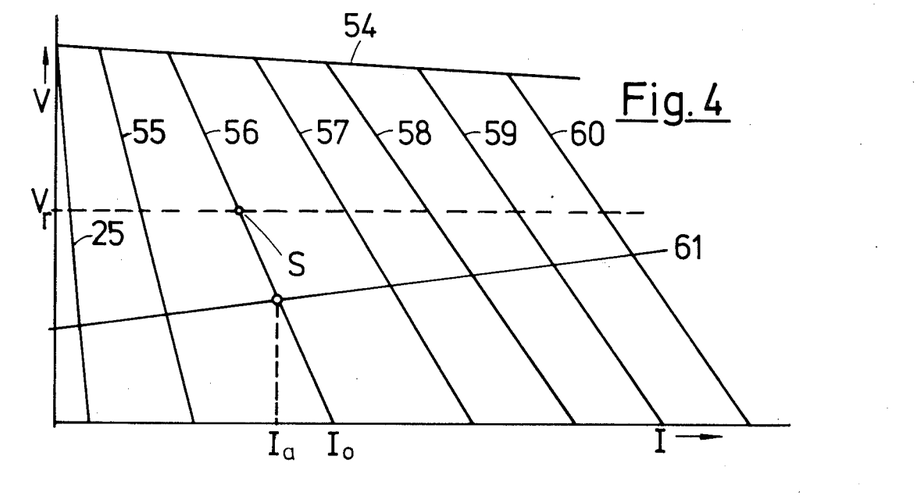
FIG. 4 is a voltage-current illustrating the mode of working of the circuit of FIG. 3.

It has been established that a certain relation between the magnitude of the arc current and the slope of the characteristic is required for optimum welding properties. More particularly, the ratio of the short-circuit current to the arc current should be approximately constant at least within a medium range of currents. Excellent results have been obtained with characteristics adjusted to provide a ratio between the short-circuit current and the arc current not below 1.1 and not above 1.2 within the entire current range. Said figures are based on the assumption that the arc voltages vary with the current according to the internationally accepted, typified arc characteristic showing a linear rise of the arc voltage from 20 to 44 volts for arc currents rising from 0 to 600 amperes. At high welding currents, a somewhat smaller relative increase of the short-circuit current may be allowable and suitable. The characteristics of FIG. 4 illustrate these maxims. The characteristics 55 to 58 have slope angles which decrease with increasing current settings, while the characteristics 59, 60 at the upper end of the arc current range have the same slope as the characteristic 58. In some cases it may even be advisable to provide for a decrease of the slope with increasing currents at the upper end of the current range, in order to avoid overload of the rectifier valves. At the lower end of the current range, a higher relative increase of the short-circuit current than the one used for medium current settings is allowable and sometimes useful. This is particularly true for arc currents lower than 50 amperes. The relative increase of the short-circuit current must, however, never exceed 50 % of the arc current.

As already stated, the portential supplied to the potentiometer 43 is proportional to the difference between a constant voltage $V_r$ and the welding voltage (in contradistinction to the potential supplied to the potentiometer 17 of FIG. 1, which is proportional to the welding voltage). One advantage of this arrangement is that it facilitates the establishing of a desired correlation between the static slope and the current setting. Another advantage is that the deviations of the actual currents from the current setting indicated by the tap 39 will be small at any setting of the tap 49 (which determines the time constant of the transient component of the control signal). This will be clear from the following explanation.

The static control signal component supplied by the tap 42 is zero when the welding voltage equals the opposing constant voltage $V_r$. Therefore, a change of the slope of the characteristic effected by adjustment of the position of the tap 42 does not displace the intersection points S (FIG. 4) of the characteristic and the line $V = V_r$. In other words, a change of the slope of the characteristic causes the characteristic to be rotated about said point, while with the system of FIG. 1 adjustment of the position of the tap 17$a$ or 17$b$ causes the characteristic to be rotated about its intersection with the current axis.

FIG. 4 shows, in addition to the characteristic 54 of the rectifier when fully conducting, a number of controlled characteristics 55–60. The dotted line indicates the constant reference voltage $V_r$. It follows from the above explanation that the change of arc current attending a change of the slope of the characteristic at a given setting of the potentiometer tap 39 (resulting in a rotation of the characteristic about the point S) is proportional to the distance between the point S and the arc characteristic 61. $V_r$ may for instance be about equal to or only a little larger than the largest arc voltage which can occur. In this case, the changes of the arc current $I_a$ caused by changes of the slope setting are small enough to allow the provision of a realistic current graduation on the potentiometer 39 independently of the setting of the potentiometer tap 49. Still better precision can be obtained by using a reference voltage $V_r$ equal to an arc voltage at the middle of the arc characteristic.

Usually the tap 49 has a fixed setting, there being rarely any need to adjust the time constant of the transient control signal component.

At low welding currents, the current supplied by the main rectifier is composed of comparatively brief pulses separated by currentless intervals. The low current supplied by the auxiliary rectifier 28 in series with the resistor 29 bridges said currentless intervals, resulting in an improved arc stability at low currents. In the embodiment of FIG. 3, the auxiliary rectifier is connected to the same transformer winding as the main rectifier 27. It is, however, equally possible to connect the auxiliary rectifier to a separate winding of the transformer 26 or to a separate transformer, preferably with a higher secondary voltage than the winding feeding the main rectifier. In that case, the secondary voltage of the transformer feeding the main rectifier may be considerably lower than the customary value (about 80 volts), for instance 65 volts. This necessitates an increase of the electric angle during which the triggered rectifier valves are conducting, resulting in a more favourable current-time curve than the one obtained at the higher supply voltage.

Figure 5:
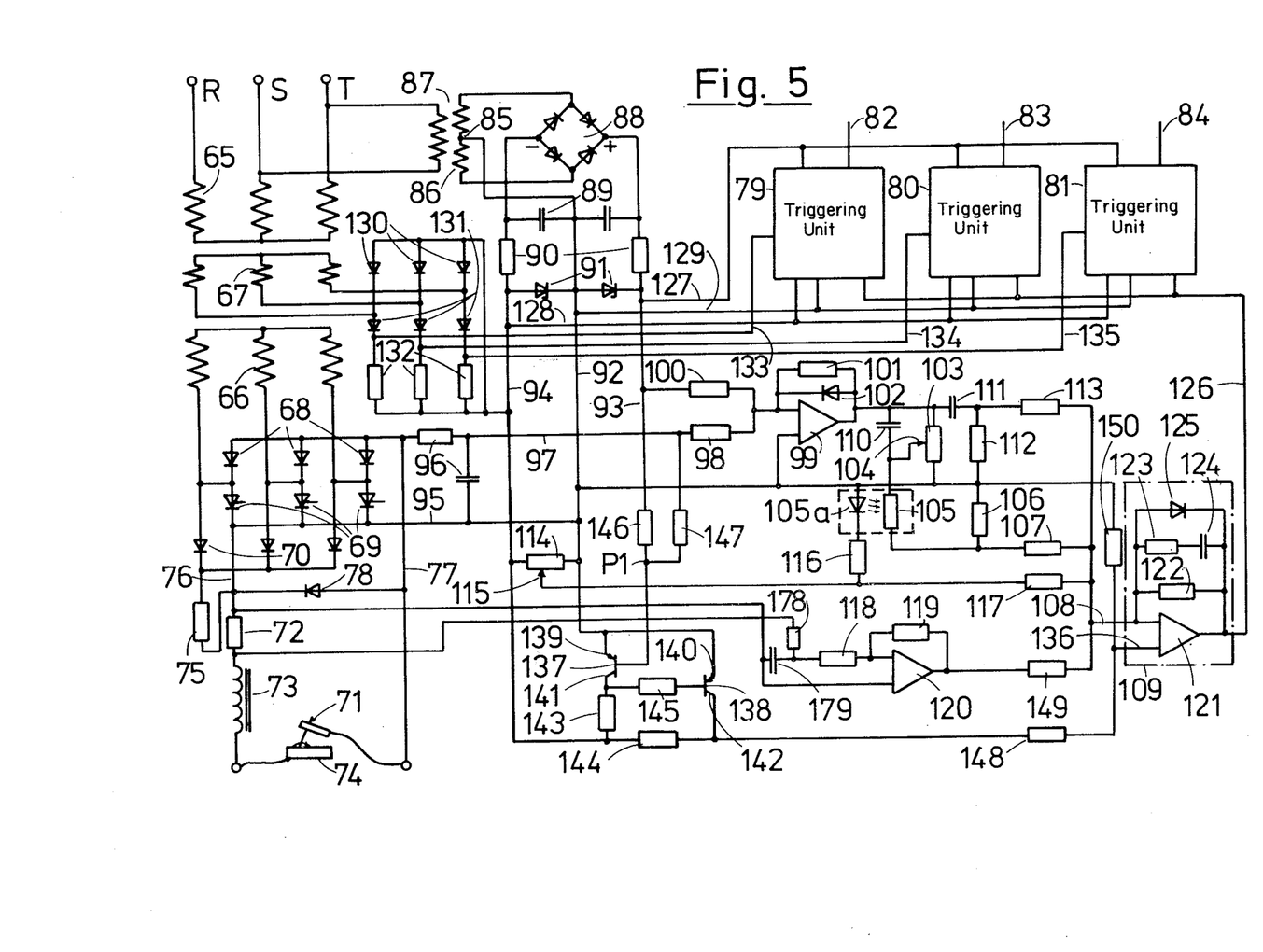
FIG. 5 is a detailed circuit diagram of a preferred embodiment of the invention.

The welding power supply of FIG. 5 has a main transformer comprising a primary 65 and a secondary 66. An auxiliary winding 67 carries no welding power but only supplies a three-phase voltage required for the control system. The secondary is connected to a main rectifier composed of three diodes 68 and three thyristors 69 and is also connected to three diodes 70 constituting together with the diodes 68 an auxiliary rectifier. One output conductor 77 of the rectifier is connected to the welding electrode 71. The other output conductor 76 is connected to the work 74 through a resistor 72 constituting the current sensing means of the control system and a welding inductor 73. The auxiliary rectifier is connected to the welding circuit in series with a current limiting resistor 75. A free-wheel diode 78 is connected between the welding current conductors 76, 77.

Figure 7:
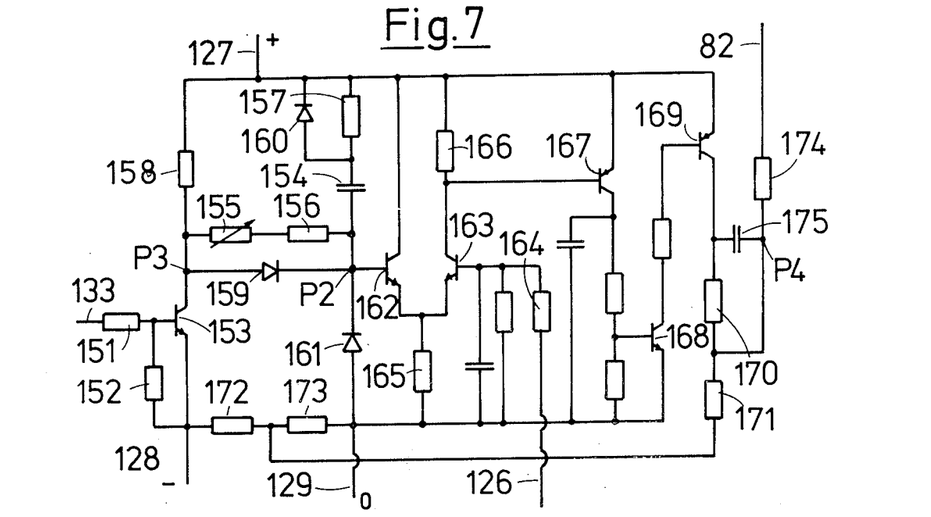
FIG. 7 is a circuit diagram of one of the triggering circuits forming part of the apparatus of FIG. 5, and FIGS. 8a to e are voltage-time diagrams illustrating the mode of working of the triggering circuit of FIG. 7.

The three thyristors 69 are each controlled by a triggering unit 79, 80, 81, each of said triggering units being connected to the control lead of a thyristor 69 through a triggering pulse conductor 82, 83, 84 (a part only of which is represented in the drawing). The circuit diagram of said triggering units is shown in FIG. 7.

The auxiliary operating voltages required for the control system are supplied by a single-phase transformer 87 the secondary 86 of which is provided with a centre top 85. The secondary voltage is rectified by a full-wave rectifier 88. The rectified voltage is smoothed by a filter composed of capacitors 89 and resistors 90 and is stabilized by means of a pair of Zener diodes 91 connected in series between the positive operating voltage conductor 93 and the negative operating voltage conductor 94. The junction of the Zener diodes is connected to the centre tap 85 and to a zero potential conductor 92.

The positive terminal of the main rectifier is connected to the zero potential conductor 92 through a conductor 95. The voltage of the other terminal of the main rectifier, which is negative with reference to the zero potential conductor 92, is supplied to a conductor 97 through a smoothing RC filter 96. The conductor 97 is connected to one end of a resistor 98 the other end of which is connected to the input of an operational amplifier 99. Another resistor 100 connects said input to the constant positive voltage of the operating voltage conductor 93. The control voltage supplied to the operational amplifier is, therefore, proportional to a current equal to the quotient of the constant voltage of the conductor 93 divided by the resistance of the resistor 100, reduced by the quotient of the welding voltage of the conductor 97 divided by the resistance of the resistor 98. The operational amplifier 99 is provided with a feed-back circuit comprising a resistor 101 in parallel with a diode 102. At zero input voltage, the operational amplifier has zero output voltage. At positive input voltages, the operational amplifier produces a negative output voltage proportional to the input voltage. At negative input voltages (that is, if the welding voltage derived component of the input voltage is larger than the constant component), the operational amplifier produces zero output voltage, the diode 102 preventing the appearance of a positive output voltage. If $K$ denotes a proportionality constant, $V_s$ the welding voltage and $V_r$ a constant voltage, the operational amplifier produces an output voltage $V_{out} = K(V_s - V_r)$, provided $V_s$ is smaller than $V_r$, and an output voltage $V_{out} = 0$, when $V_s$ is equal to or exceeds $V_r$. Said output voltage is supplied to a potentiometer 103 connected between the output lead of the operational amplifier 99 and the zero potential conductor 92. The tap 104 of said potentiometer is connected to a second potentiometer connected between said tap and the zero potential conductor 92, said second potentiometer consisting of a resistor 105 in series with a resistor 106. The resistor 105 is a light sensitive resistor arranged to be actuated by the light radiation of a photo diode 105a. An increase of the radiation actuating the resistor 105 produces a decrease of the resistance of said resistor. The potentiometers 103 and 105–106 correspond to the potentiometers 48 and 43, respectively, in FIG. 3. The junction of the resistors 105 and 106 is connected to one end of a resistor 107, the other end of which is connected to an input lead 108 of an amplifier device 109 corresponding to the amplifier device 33 of FIG. 3.

A capacitor 110 having a function identical with the one of the capacitor 50 of FIG. 3 is connected between the output lead of the operational amplifier 99 and the potentiometer tap 104. Moreover, a capacitor 111 in series with a resistor 112 is connected between the output lead of the operational amplifier 99 and the zero potential conductor 92, the junction of the elements 111 and 112 being connected to the input lead 108 of the amplifier device 109 through a resistor 113. The function of the circuit comprising said elements is identical with the function of the corresponding circuit 52, 53, 34 of FIG. 3.

A potentiometer 114 is connected between the zero potential conductor 92 and the negative operating voltage conductor 94. The adjustable negative voltage provided by the tap 115 is supplied to the photo diode 105a in series with a resistor 116 and is also supplied to one end of a resistor 117 the other end of which is connected to the input lead 108 of the amplifier device 109.

The small voltage drop caused by the flow of the welding current through the resistor 72 is smoothed by a filter comprising a resistor 178 and a capacitor 179 and connected through a series resistor 118 to the input lead of an operational amplifier 120 provided with a feed-back resistor 119. The output voltage of said amplifier, which is positive with respect to the zero potential conductor 92 and proportional to the welding current, is supplied to one end of a resistor 149 the other end of which is connected to the input lead 108 of the amplifier device 109.

Accordingly, the control voltage supplied to the input lead 108 of the amplifier device 109 comprises the following static components:

a. A constant, negative component adjustable by means of the potentiometer 114, b. a component supplied by the operational amplifier 99 through potentiometers 103 nd 105–106, said component being zero as long as the welding voltage exceeds a predetermined value $V_r$ and assuming a negative value proportional to the difference $V_r - V_s$ for welding voltages $V_s$ lower than $V_r$, c. a positive component supplied by the operational amplifier 120, said positive component being proportional to the welding current.

The amplifier device 109 comprises an operational amplifier 121 and a feed-back circuit therefor comprising three branches connected in parallel, the first branch containing a resistor 122, the second branch containing a resistor 123 in series with a capacitor 124, and the third branch containing a diode 125 poled so as to block the appearance of negative output voltages. The operational amplifier 121 as well as the other operational amplifiers comprised in the circuit produces an output voltage the polarity of which is opposite to the polarity of the input voltage.

The output signal of the amplifier device 109 is supplied through a conductor 126 to each of the three triggering units 79, 80, 81. The auxiliary voltages required for the operation of the triggering units are supplied to the triggering units by conductors 127, 128 and 129 connected to the operation voltage conductors 93, 94 and the zero potential conductor 92, respectively. Moreover, each of the triggering units is supplied with a pulsating voltage produced by a rectifier device connected to the auxiliary winding 67 of the main transformer, said rectifier device comprising three branches connected in parallel to each other, each of said branches comprising a pair of rectifier valves 130, 131 in series with a resistor 132. The terminals of the auxiliary winding 67 are each connected to the junction between the two rectifier valves in one of the branches. The junction of the three resistors 132 is connected to the negative operating voltage conductor 94. The positive voltage appearing across each of the three resistors is supplied through conductor 133, 134, 135, respectively, to one triggering unit 79, 80, 81, respectively. The circuit arrangements and the function of the triggering unit are described in detail below with reference to FIGS. 7 and 8. It is sufficient to mention here that the angular position of the triggering pulses produced by the triggering units varies in response to the magnitude of the control signal supplied through the conductor 126 in such a way that the thyristors remain in the non-conducting state as long as the control voltage is zero, and that a control voltage above zero maintains the thyristors in the conductive state during the period increasing with the magnitude of the control voltage.

Figure 6:
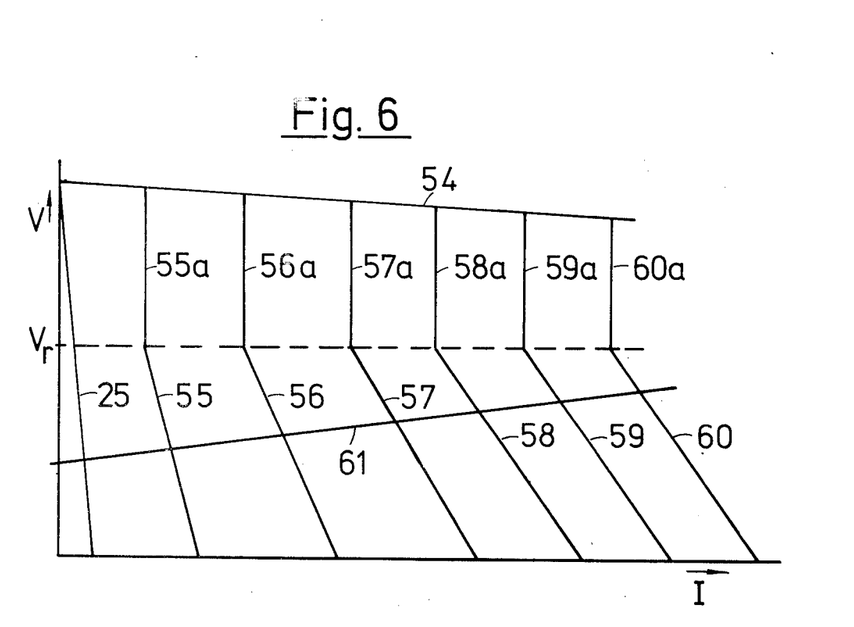
FIGS. 6 and 6a are voltage-current diagrams illustrating the mode of working of the circuit of FIG. 5.

FIG. 6 shows a group of charateristics corresponding to different settings of the potentiometer 114. The reference numerals correspond to those employed in FIG. 4.

Each of the control characteristics comprises a sloping portion, for instance 56, corresponding to the sloping characteristic of FIG. 4, but extending up to the voltage $V_r$ only, and a vertical portion in the voltage range between $V_r$ and the maximum voltage determined by the characteristic 54 of the power supply when the thyristors are fully conducting. Said vertical portion is due to the function of the amplifier 99 described above, its output voltage remaining at zero for all welding voltages above $V_r$, whereby in this voltage range the current feedback only is active. The voltage $V_r$ should preferably have a value within the range of 40 to 50 volts.

The slope of the characteristic provided by the control system has a certain relation to the current setting; more particularly, the steepness of the characteristic is reduced with increased current settings up to a certain current setting but maintained approximately constant in the upper current range. This relation between the steepness of the characteristic and the current setting has been obtained by suitable adjustment of the characteristic of the control unit constituted by the photo diode 105a and the light sensitive res.. or 105. More particularly, the properties of said contrc unit are such that, up to a certain limit, an increase of the voltage supplied by the potentiometer 114 causes a reduction of the resistance of the resistor 105 which, however, remains constant when the voltage is increased above said limit.

With reference to FIG. 4 it was stated that the voltage $V_r$ may be chosen within the arc voltage range. In the system according to FIG. 5 the line $V = V_r$, however, should not intersect the arc characteristic, as the load point should be within the sloping portion of the characteristic. It is possible, however, to make the difference between the arc voltage and the reference voltage $V_r$ as small as desired by providing a reference voltage $V_r$ which varies with the current setting.

Figure 6A:
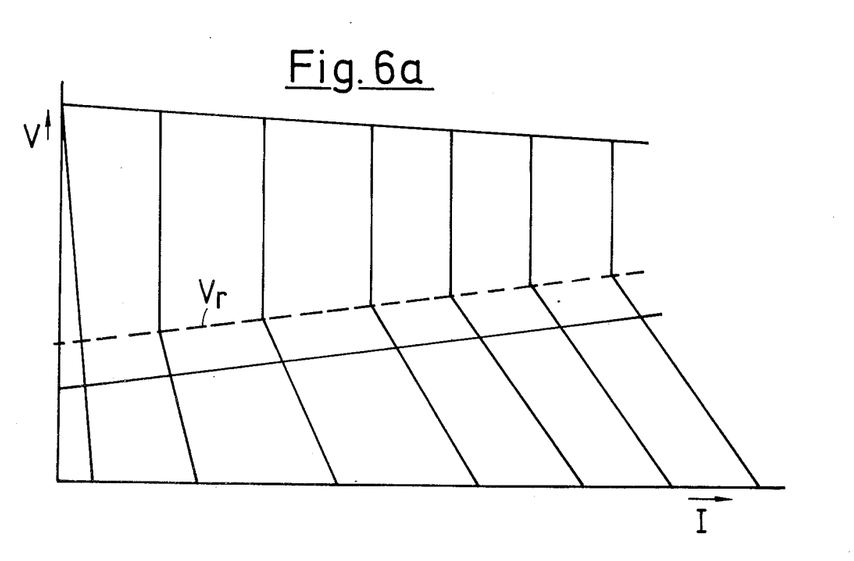

FIG. 6a illustrates this possibility, which can be realized for instance by using a variable resistor 100 and providing a link between its adjusting member and the adjusting member of the potentiometer 114 such that the resistance of the resistance 100 is reduced at increasing potentiometer voltages.

In the previous description of the action of the amplifier device 109 it was assumed that its second input lead 136 has the zero potential defined by the zero potential conductor 92. The apparatus according to FIG. 5 comprises, however, a special circuit supplying a negative bias voltage to the input lead 136 as long as no current flows in the welding circuit. When thus biased, the amplifier device 109 produces no output voltage, so that the thyristors of the welding rectifier are entirely non-conductive. The purpose of this arrangement is to prevent a strong current surge when the welding operation is initiated.

The special circuit referred to comprises two transistors 137, 138. The emitters 139, 140 of the transistors are connected to the zero potential conductor 92, while the collectors 141, 142 are each connected to the negative operation voltage conductor 94 through a resistor 143, 144, respectively. The collector 141 of the transistor 137 is connected with the base of the other transistor 138 through a resistor 145. The base of the transistor 137 is connected to the junction P1 of two resistors 146, 147, and 146 of which is connected to the positive operating voltage conductor 93, while the other resistor 147 is connected to the conductor 97 carrying the smoothed negative output voltage of the welding rectifier. The resistors 146, 147 are so adjusted that the point P1 remains at negative polarity with respect to the zero potential conductor 92 as long as the voltage of the conductor 97 is high (near the no-load value), but assumes positive polarity with respect to the zero potential conductor when the output voltage of the welding rectifier drops below a predetermined value. The collector 142 of the transistor 138 is connected to the input lead 136 of the amplifier 121 through a resistor 148. The input lead 136 is also connected to the zero potential conductor 92 through a resistor 150.

The action of the circuit described is as follows. As long as the conductor 97 is at the no-load voltage, the point P1 is at negative potential, so that the transistor 137 is conducting while the transistor 138 is non-conducting. Under these conditions the input lead 136 receives a negative voltage, more particularly, the fraction of the negative operating voltage determined by the potentiometer arrangement 144, 148, 150. The output voltage of the amplifier device 109 is zero, and the thyristors are non-conductive. When the output voltage of the rectifier drops sufficiently to render the voltage at the point P1 positive, the transistor 137 is rendered non-conducting, while the transistor 138 is rendered conducting and connects the input lead 136 of the amplifier 121 to the zero potential conductor 92 through the resistor 148.

It will be clear from the above description that the auxiliary rectifier constituted by the diodes 70 together with the diodes 68 of the power supply unit according to FIG. 5 has the additional functions of maintaining a no-load voltage and supplying the initiating current required to operate the special circuit described. FIG. 7 shows the circuit arrangements of the triggering unit 79 of FIG. 5. The circuit includes the conductor 127 connected to the positive operating voltage conductor 93, the conductor 129 connected to the zero potential conductor 92, the conductor 128 connected to the negative operating voltage conductor 94, the conductor 133 supplying the synchronized voltage pulses appearing across one of the resistors 132, the conductor 126 supplying the control signal produced by the amplifier 109, and the conductor 82 connected to the firing lead of one of the thyristors of the main rectifier.

The direct current pulses transmitted by the conductor 133 are supplied to a potentiometer composed of two resistors 151, 152, the junction of which is connected to the base of a transistor 153, the emitter of which is connected to the negative operating voltage through the conductor 128. The collector of the transistor 153 is connected to the conductor 127 carrying the positive operating voltage through an RC-device comprising a capacitor 154, the charging resistors 155, 156, 157, a discharging resistor 158 and two diodes 159, 160. The resistor 155 is adjusted to provide a desired charging time constant. The junction P2 between the resistor 156, the capacitor 154 and the diode 159 is connected to the base of a transistor 162 and is also connected to the zero potential conductor 129 through a diode 161 poled to allow positive potential only to appear at the point P2. Said diode serves to protect the transistor 162 against overload. The transistor 162 is combined with a second transistor 163 to form a differential amplifier device. The control voltage produced by the operational amplifier 121 (FIG. 5) is supplied to the base of the transistor 163 through the conductor 126 and a resistor 164. The transistors 162, 163 have a common emitter resistor 165. The collector of the transistor 163 is connected to the conductor 127 carrying the positive operating voltage through a resistor 166 and is also directly connected to the base of the transistor 167 the emitter of which is connected to the conductor 127. The transistor 167 constitutes the first stage of a pulse amplifier the second and third stages of which are constituted by the transistors 168 and 169, respectively. A fraction of the negative operating voltage is supplied by a potentiometer arrangement 172, 173 to the collector of the transistor 169 through resistors 171, 170. The conductor 82 connected to the firing lead of one of the thyristors 69 is connected to the collector of the transistor 169 through the series resistors 174 and 170, a capacitor 175 being connected in parallel with the resistor 170.

Figure 8:
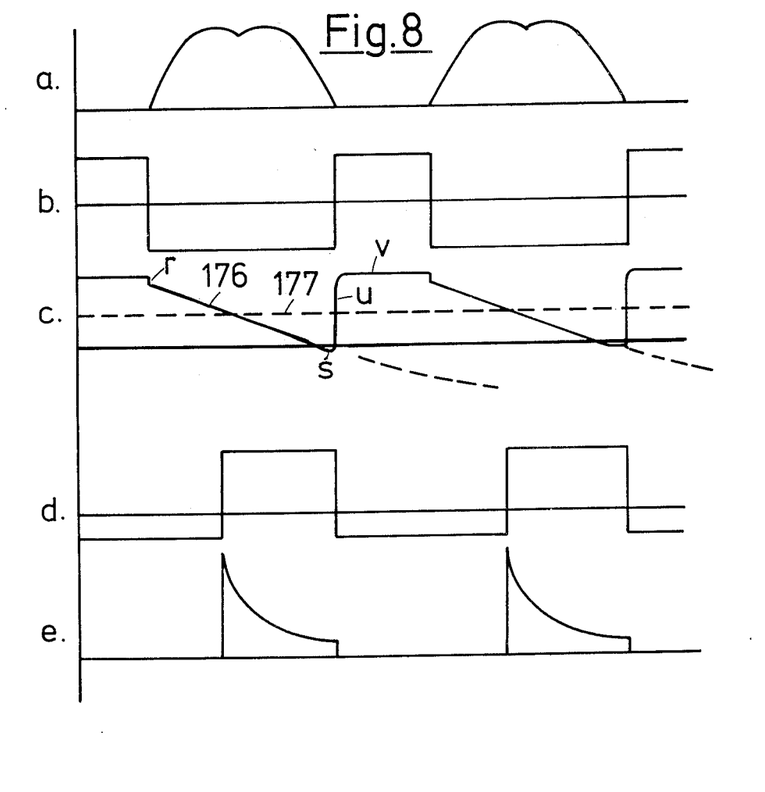

In FIG. 8, the diagram a represents the voltage pulses supplied by the conductor 133, the diagram b represents the potential of the point P3, the diagram c represents the potential of the point P2 (the full line 176) and the control voltage supplied by the amplifier 121 through the conductor 126 (the dotted line 177), the diagram d represents the potential of the junction point P4 of the resistors 170, 171, and the diagram e represents the triggering pulses transmitted through the conductor 82.

The voltage pulse transmitted by the conductor 133 (FIG. 8a) renders the transistor 153 conducting for the duration of said pulse, whereby the potential of the point P3 is rendered negative (FIG. 8b). A charging current then flows from the positive operating voltage conductor 93 through conductor 127, resistor 157, capacitor 154, resistors 156, 155, the transistor 153 and the conductor 128 to the negative operating voltage conductor 94. The charging of the capacitor 154 produces a drop of the potential of the point P2 (line 176 in FIG. 8c). The sudden voltage drop r at the beginning of the charging period is caused by the potentiometer action of the resistors 155-156 and 157. The charging of the capacitor goes on until the potential of the point P2 has dropped to the zero level. The potential then remains constant (the portion s of the diagram). Termination of the voltage pulse transmitted through the conductor 133 causes the transistor 153 to be restored to the non-conducting state. The capacitor 154 is then discharged through the resistor 158 in series with the diodes 159, 160. The resistance of the discharge resistor 158 is much smaller than the total resistance of the charging resistors 155, 156, 157. The discharge therefore proceeds quickly (the part u of the diagram). The point P2 as well as the point P3 are now again at the potential of the positive operating voltage conductor (the part v of the diagram).

The transistor 162 is conducting as long as its emitter potential exceeds the emitter potential of the transistor 163, said last-mentioned potential being equal to the control voltage of the conductor 126. As soon as said last-mentioned emitter potential is the larger one, the transistor 163 is rendered conducting and blocks the transistor 162. This occurs at the intersection of the curve 176 and line 177 in FIG. 8c. The resulting pulse is amplified by the three-stage pulse amplifier. When the transistor 169 of the last amplifier stage is rendered conductive, a positive potential is imparted to the point P4 (FIG. 8d). This potential leap causes a current surge through the capacitor 175 and a corresponding pulse through the conductor 82 (FIG. 8e). The triggering current is cut off as soon as the discharge of the capacitor 154 causes the potential at the point P2 to rise to a positive value sufficient to make the emitter potential of the transistor 162 exceed the one of the transistor 163, resulting in restoring the transistor 163 to its non-conducting state. This occurs at the intersection of the charging line $u$ (FIG. 8c) and the line 177. The transistor 169 as well is rendered non-conducting, causing the potential at the point P4 to drop immediately to a negative value (FIG. 8d) determined by the potentiometer 172, 173. The negative bias thus produced prevents spurious firing of the thyristor. No refiring of the thyristor can occur until the next voltage pulse (FIG. 8a) has been supplied by the conductor 133.

The described triggering circuit has the advantage that the triggering angle does not vary with the manufacturing tolerances of the transistors, which may be considerable. The capacity of the capacitor 154 and the resistance of the resistors 155, 156, 157 are the only factors governing the charging of the capacitor 154. Said elements cannot be assumed to be absolutely alike in all of the three triggering units. Adjustment of one element only in each of the triggering units, to wit, the resistor 155, is, however, sufficient to provide identical time constants and consequently identical charging diagrams in all of the three triggering units. The steepness of the charging line 176 is sufficient to provide a sharply defined intersection with the horizontal line 177 representing the control signal transmitted by the operational amplifier 121.

I claim:

1. A direct current power supply for manual arc welding having a steeply drooping, adjustable volt-ampere characteristic comprising
    a polyphase transformer having a plurality of secondary output leads carrying mutually phase displaced voltages, a polyphase rectifier system connecting said secondary output leads to a pair of D.C. welding current conductors for supplying a direct current to a welding arc struck between a welding electrode and a workpiece, said polyphase rectifier system comprising a set of triggered rectifier valves connected one in series with each of said secondary output leads, said triggered rectifier valves having each a trigger terminal for initiating current flow through the valve,
    means for periodically supplying igniting pulses to each of said trigger terminals, including means for causing the angular position of said pulses to vary in response to a direct current control signal,
    means for generating said direct current control signal comprising the following means,
    a. means for producing an adjustable direct current reference, signal, including manually operable means for adjusting said reference signal,
    b. means including a welding current sensing means for producing a welding current feed-back D.C. signal equal to the welding current flowing in the pair of welding current conductors multiplied by a first factor of proportionality,
    c. means including a welding voltage sensing means for producing a welding voltage feed-back D.C. signal equal to the voltage between the welding current conductors multiplied by a second factor of proportionality,
    d. summing means for combining said reference signal, said welding current feed-back signal and said welding voltage feed-back signal into a compound signal constituting said control signal, both of said feed-back signals being supplied to said summing means in opposing relationship to said reference signal,
    e. slope adjustment means comprising means for adjusting the proportion between said first and second factors of proportionality, and,
    f. means linking said manually operable means for adjusting the reference signal and said proportion adjusting means to provide automatically a desired correlation between the slope of volt-ampere characteristic of the power supply and the reference signal setting.

2. A direct power supply as claimed in claim 1 in which said linking means provides an automatic decrease of the slope of the volt-ampere characteristic of the power supply on increase of the reference signal.

3. A direct current power supply as claimed in claim 1 in which the correlation of the slope of the volt-ampere characteristic of the power supply and the reference signal setting is such as to provide a substantially constant current ratio $I_o/I_a$ for all settings of the reference signal, $I_a$ being the arc current in the welding current conductors, and $I_o$ being the current in said conductors on short circuiting of the welding arc.

4. A direct current power supply as claimed in claim 3 in which said current ratio has a value between 1.1 and 1.2.

5. A direct current power supply as claimed in claim 1 comprising a common manual control member and mechanical means connecting said control member to both said reference signal adjusting means and said proportion adjusting means.

6. A direct current power supply as claimed in claim 1 comprising means responsive to a control current for adjusting said proportion, and circuit means for supplying to said adjustment means a control current proportional to said reference signal.

7. A direct current power supply for manual arc welding having a steeply drooping, adjustable volt-ampere characteristic comprising
    a polyphase transformer having a plurality of secondary output leads carying mutually phase displaced voltages, a polyphase rectifier system connecting said secondary output leads to a pair of D.C. welding current conductors, said polyphase rectifier system comprising a set of triggered rectifier valves connected one in series with each of said secondary output leads, said triggered rectifier valves having each a trigger terminal for initiating current flow through the valve,
    means for periodically supplying igniting pulses to each of said trigger terminals, including means for causing the angular position of said pulses to vary in response to a direct current control signal, means for generating said direct current control signal comprising the following means, to wit, a. means for producing an adjustable D.C. reference signal, including manually operable means for adjusting said reference signal, b. means including a welding current sensing means for producing a welding current feed-back D.C. signal equal to the welding current flowing in the pair of welding current conductors multiplied by a first factor of proportionality, c. means including a welding voltage sensing means for producing a welding voltage feed-back D.C. signal equal to the voltage between the welding current conductors multiplied by a second factor of proportionality, d. a capacitor connected in series with a resistor, means including a welding voltage sensing means for submitting said series connection to potential variations proportional to the variations of the welding voltage, and means for producing a transient feed-back signal equal to the voltage appearing across said resistor multiplied by a third factor of proportionality, e. summing means for combining said reference signal, said welding current feed-back signal, said welding voltage feed-back signal and said transcent feed-back signal into a compound signal constituting the control signal aforementioned, said welding current feed-back signal and said welding voltage feed-back signal being supplied to said summing means in opposing relationship to said reference signal, transient feed-back signals caused by discharge of said capacitor on decrease of the welding voltage being supplied to said summing means in aiding relationship to said reference signal, f. transient slope adjusting means comprising means for adjusting the proportion between said first and said third factors of proportionality, and, g. means linking said manually operable means for adjusting the reference signal and said proportion adjusting means to provide automatically a desired correlation between the transient slope of the voltage-ampere characteristic of the power supply and the reference signal setting.

8. A direct current power supply as claimed in claim 7 which additionally comprises means for suppressing the transient feed-back signal caused by a flow of charge current through the series conection of the capacitor and the resistor.

9. A direct current power supply as claimed in claim 7 which additionally comprises means including a full-wave rectifier bridge for reversing the polarity of the transient feed-back signal supplied to said summing means on charging of said capacitor, whereby the transient feed-back signal is supplied in aiding relationship to said reference signal irrespectively of whether it is caused by a charge or by a discharge of the capacitor.

10. A direct current power supply as claimed in claim 7 which has an open circuit voltage exceeding the voltage required for sustaining a welding arc and which additionally comprises a signal limiting means arranged to limit the maximum magnitude of the transient feed-back signal to a level substantially lower than the one corresponding to a sudden drop of the voltage between the welding current conductors from the open-circuit voltage to nil.

* * * * *

UNITED STATES PATENT OFFICE
CERTIFICATE OF CORRECTION

PATENT NO. : 3,928,746
DATED : December 23, 1975
INVENTOR(S) : Rolf Ericsson

It is certified that error appears in the above–identified patent and that said Letters Patent are hereby corrected as shown below:

[30] Foreign Application Priority Data

April 18, 1972 -- Sweden --    4963/72

Column 7, line 2, "the" (second occurrence) should be --on--.

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*